F. HACHMANN.
CLAMP.
APPLICATION FILED MAR. 13, 1915.
1,233,223. Patented July 10, 1917.
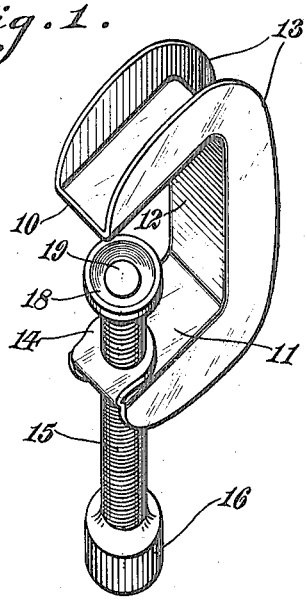
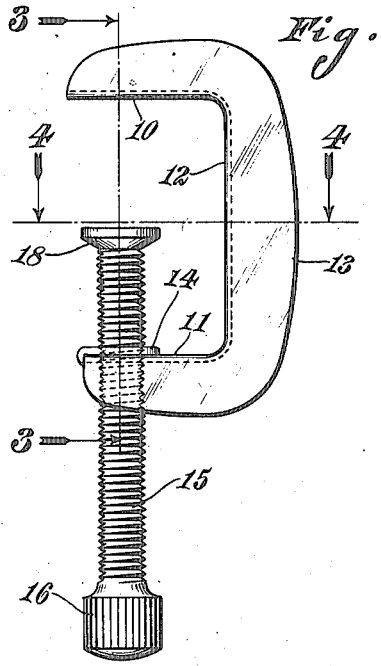
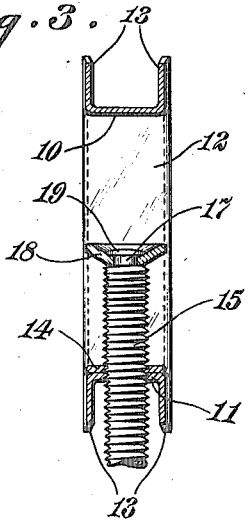
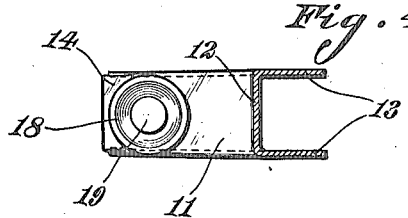
Witnesses:
Harry H. Reiss.
Arthur B. Cremer.
Inventor:
FREDERICK HACHMANN,
By John H. Bruninga
His Attorney.

UNITED STATES PATENT OFFICE.

FREDERICK HACHMANN, OF ST. LOUIS, MISSOURI, ASSIGNOR OF ONE-FOURTH TO FRED C. SCHOENTHALER AND ONE-FOURTH TO JAMES B. HOLLIS, OF ST. LOUIS, MISSOURI.

CLAMP.

1,233,223.  Specification of Letters Patent.  Patented July 10, 1917.

Application filed March 13, 1915. Serial No. 14,275.

*To all whom it may concern:*

Be it known that I, FREDERICK HACHMANN, a citizen of the United States, and residing at St. Louis, in the State of Missouri, have invented a certain new and useful Improvement in Clamps, of which the following is a specification.

This invention relates to clamps, and more particularly, to clamps for small work.

One of the objects of this invention is to provide a sheet metal clamp which combines lightness with rigidity.

Another object is to provide a clamp which is simple in construction, consists of a few parts, and is cheap to manufacture.

Further objects will appear from the detail description taken in connection with the accompanying drawing, in which:

Figure 1 is a perspective view of one form of clamp embodying this invention;

Fig. 2 is a side elevation;

Fig. 3 is a section on the line 3—3, Fig. 2; and,

Fig. 4 is a section on the line 4—4, Fig. 2.

Referring to the accompanying drawing, it will be noted that the clamp body comprises a pair of arms 10 and 11 connected by a yoke 12. This body is constructed of sheet metal, and is of channel section so as to provide a body web and radially projecting side flanges 13. A part 14 of the web, which normally is an extension of the metal forming the web, is bent over against the web, and this piece and the web are perforated and threaded to form a reinforced threaded socket. This socket is adapted to receive a screw 15 having a knurled head 16 and a reduced part 17 receiving a swivel plate or disk 18, which is rotatively mounted on the screw by peening or riveting over the end of the reduced portion 17 to form a head 19. The swivel plate is of conical form so that the peened over part 19 will be countersunk.

The clamp body is thus formed of a single piece of sheet metal formed by suitable dies so as to have the maximum strength with the minimum of material used. The reinforced socket is formed in a simple manner, and forms an ample thread for receiving the screw. The swivel plate 18 is also formed of stamped sheet metal, and this swivel plate is placed in position on the screw after this screw is placed in the socket. The screw and the arm 10 thus form the coöperating jaws of the clamp. The clamp body may be either enameled, or the whole may be plated.

It is obvious that various changes may be made in the details of construction without departing from the spirit of this invention. It is, therefore, to be understood that this invention is not to be limited to the specific construction shown and described.

Having thus described the invention what is claimed is:

A clamp comprising a U-shaped pressed-metal body formed in one piece and presenting a pair of relatively spaced arms fixedly connected by a yoke, said body, in cross-section, consisting of a continuous body web and a reinforcing flange projecting radially from each side of said web, the end of said web being turned over against itself and said web and said turned over part being threaded to form a socket, and an adjustable, work-clamping screw mounted in said socket for coöperation with the other arm to clamp the work.

In testimony whereof I affix my signature in the presence of these two witnesses.

FREDERICK HACHMANN.

Witnesses:
JOHN A. DOWDALL,
ARTHUR B. CREMER.